Sept. 15, 1970 KATSUYA HIRUTA 3,529,301

MAGNETIC DISC MEMORY HOUSING DEVICE

Filed May 31, 1968 3 Sheets-Sheet 1

INVENTOR.
KATSUYA HIRUTA

BY

OSTROLENK, FABER, GERB & SOFFEN

ATTORNEYS

INVENTOR.
KATSUYA HIRUTA
BY
OSTROLENK, FABER, GERB & SOFFEN
ATTORNEYS

INVENTOR.
KATSUYA HIRUTA

BY

OSTROLENK, FABER, GERB & SOFFEN

ATTORNEYS

United States Patent Office 3,529,301
Patented Sept. 15, 1970

3,529,301

MAGNETIC DISC MEMORY HOUSING DEVICE

Katsuya Hiruta, Tokyo, Japan, assignor to Nippon Electric Company Limited, Tokyo, Japan Filed May 31, 1968, Ser. No. 733,517
Claims priority, application Japan, May 31, 1967, 42/45,959, 42/45,960, 42/45,961, 42/45,962 (all utility models)
Int. Cl. G11b *5/82, 17/00, 23/04*
U.S. Cl. 340—174.1 7 Claims

ABSTRACT OF THE DISCLOSURE

A memory device comprised of a magnetic disc memory encased within a housing. The housing, which substantially permanently encases the magnetic disc, is provided with apertures arranged in radial fashion, relative to the disc, along the housing for enabling access to the disc by magnetic record and/or read-out heads. A central opening in the housing, located relative to the disc spindle, provides access to the disc spindle by disc driving means. Shutters, movably mounted within the housing, are normally biased to seal the radially aligned openings when the memory assembly is not in use. The housing is provided with openings for receiving projecting pins extending from information storage equipment which enter into the housing and engage slide members for the purpose of opening the shutters when the housing is inserted along guide rails provided within the information storage equipment. Also mounted in the housing is a braking device normally making abutting engagement with the edge of the disc to restrain the disc from movement during the times in which the assembly is not in place within the magnetic disc equipment. Insertion of the aforementioned projecting pins, in addition to opening the normally closed shutters, also simultaneously releases the braking member from braking engagement with the disc so as not to hamper rotation thereof.

The present invention relates to information storage devices of the magnetic disc type and, more particularly, to a novel cartridge-type magnetic disc structure for use with magnetic information storage devices.

Magnetic disc devices employing detachable disc memory elements are normally comprised of a driving means for rotating the magnetic disc element loaded into the apparatus and to a mechanism for fixing and releasing the memory element to and from the driving means, as well as incorporating magnetic heads for writing-in and/or reading-out information signals to and from the disc memory element as it rotates.

In magnetic disc devices of this general type, a multitude of detachable magnetic discs may be employed in one such data storage device. With respect to such discs, it is common practice to store them within a plastic container when not in use in order to prevent the magnetic surfaces from being soiled or damaged. If the magnetic disc could be inserted into the magnetic disc equipment while remaining encased within the container rather than necessitating removal from the container before insertion into the magnetic disc device, the possibility of soiling or damaging the magnetic disc element would be completely avoided and the disc element itself would be much simpler to use and manipulate from the viewpoint of storage, handling, insertion and removal. In order that disc elements may satisfy such requirements, it is necessary to provide a container which is capable of providing for engagement of the disc with the driving means when loaded into the disc storage equipment. In addition thereto, the container must be provided with an aperture which allows the recording and/or reproducing heads to make contact with the disc when loaded into the storage device. Such apertures should also be provided with means for sealing the apertures when the magnetic disc assembly is not in use.

The container should further be provided with a locking mechanism which keeps the disc element in an immovable state when the magnetic disc assembly is not in use so as to prevent the disc from being damaged by collision with the interior of the container and such device should further be provided with means for releasing the locking mechanism when the disc assembly is inserted into the magnetic disc equipment. Since such magnetic disc equipment is normally handled by a number of unidentifiable operators and since the magnetic disc elements are loaded and unloaded quite frequently, the loading and unloading operations should be made as simple as possible.

In conventional magnetic disc elements, for example, as exemplified by U.S. Pat. No. 3,176,281, there is shown therein a magnetic disc element which is loaded into the equipment by movement of the disc element in the direction of the longitudinal axis of the disc driving means. In the case where the disc loaded into the information storage equipment contains information on both surfaces and therefore requires two magnetic heads disposed so as to face and engage each of the disc surfaces, the magnetic heads must be kept free of the space through which the parallelepiped or cylindrical-shaped container is caused to pass each time the disc element is loaded into and/or removed from the storage equipment. For this reason, the design of the magnetic disc information storage equipment becomes quite complicated and requires a tedious time consuming operation for loading and unloading of the disc elements.

In cases where magnetic heads are provided for writing-in or reading-out data from only one surface of the magnetic discs, the heads must first be removed and then the disc must be turned over to utilize the opposite surface of the disc. This procedure is also quite troublesome and time consuming.

It is therefore one primary object of the present invention to provide an improved magnetic disc memory device and disc container whose design simplifies the loading and unloading of the disc elements into and out of the information storage equipment.

Another object of the present invention is to provide an improved magnetic disc memory device and disc container which are so designed as to make it possible to load and unload the disc elements without regard to the fixed magnetic heads facing each of the two surfaces of the magnetic disc.

In accordance with one exemplary embodiment of the present invention, there is provided a magnetic disc memory device and a plate-shaped disc container adapted for receiving the device which, in turn, is comprised of shutter means for normally sealing apertures provided along the container to allow the magnetic heads of the information storage equipment to come into contact with each surface of the disc element, means mechanically coupled with the shutter means for locking and releasing the disc element within the container, as well as openings formed in the central portion of the container substantially aligned with the disc spindle to permit insertion of the disc driving means for engaging the spindle. Two small apertures formed on the narrow surface of the container are provided for admitting engaging projecting pins provided on the side of the information storage equipment for operating the shutter means to unseal the normally sealed apertures to allow the magnetic heads to gain access to the memory disc and for releasing the locking means to enable the disc to be rotated.

Thus, the structure of the present invention makes it possible to load magnetic disc elements into magnetic disc information storage equipment while remaining encased within the element container. Also, since the loading is accomplished by inserting the container in a direction perpendicular to the longitudinal axis of the disc driving means and not parallel to the same axis, the magnetic heads need only be slightly displaced in a direction perpendicular to the disc surface for making engagement with the disc surface or for being disengaged therefrom. Loading and unloading of the disc is further facilitated without regard to the position of the magnetic heads. Also, the information storage equipment as a whole and, particularly the structure of the head portion, is accordingly greatly simplified.

It is therefore one object of the present invention to provide a novel magnetic disc and magnetic disc housing assembly which permanently encases the disc assembly when the disc is inserted into information storage equipment as well as those times during which the disc is not in use.

Still another object of the present invention is to provide a novel magnetic disc and disc container for permanently encasing the disc, which container is provided with normally closed shutter means which may be operated to the open position to enable magnetic heads to gain access to the disc recording surfaces automatically upon insertion of the container into information storage equipment.

Still another object of the present invention is to provide a novel magnetic disc and disc container for permanently encasing the disc, which container is provided with normally closed shutter means which may be operated to the open position to enable magnetic heads to gain access to the disc recording surfaces automatically upon insertion of the container into information storage equipment and further comprising locking means normally biased to lock the disc against rotation when the container and disc are not in use and in being automatically moved to a disengaged position to unlock the disc upon insertion of the disc container into associated information storage equipment.

These as well as other objects of the present invention will become apparent when reading the accompanying description and drawings in which:

FIG. 1*a* shows a plan view of one preferred embodiment of the present invention in which a portion of the disc container has been cut away to expose the interior components.

FIG. 1*b* shows the exposed interior portion of the cartridge of FIG. 1*a* wherein the cartridge is shown in a loaded state as compared with FIG. 1*a* which shows the cartridge in the unloaded state.

Figure 5A:
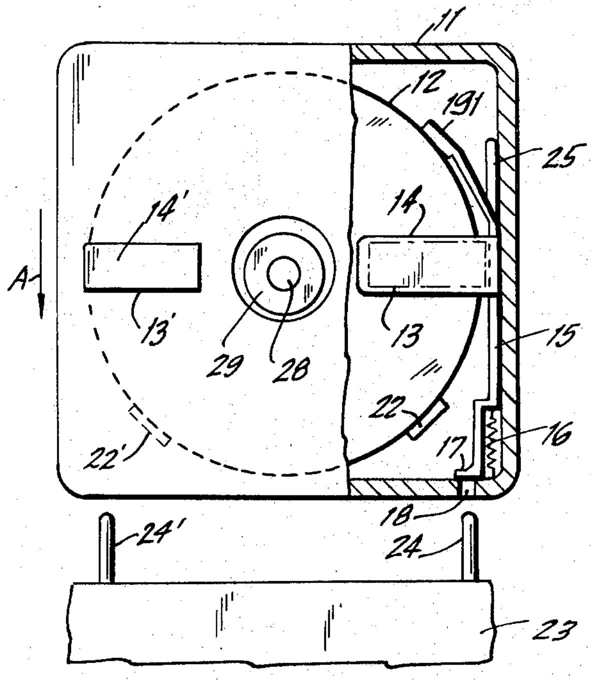
Figure 5B:
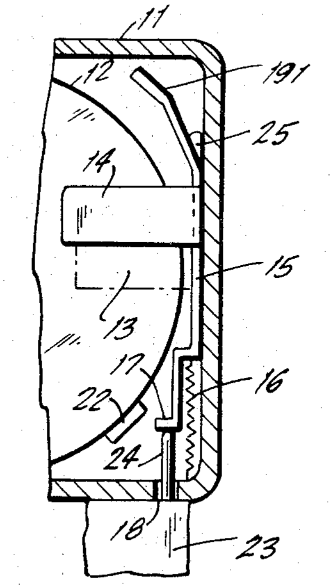

FIGS 5*a*–5*b*; FIGS. 6*a*–6*b* and FIGS. 7*a*–7*b* show plan views of substantially the same type as shown in FIGS. 1*a*–1*b*, respectively, for modifications of the preferred embodiment of FIGS. 1*a* and 1*b*.

Figure 1A:
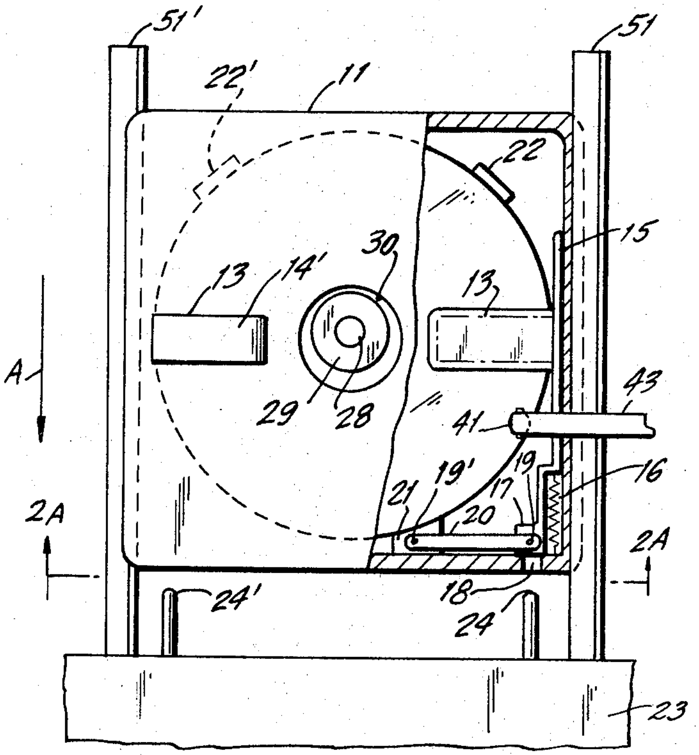
Figure 1B:
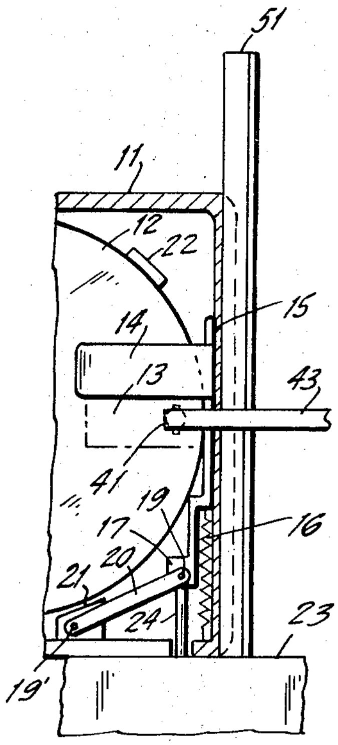
Figure 2:
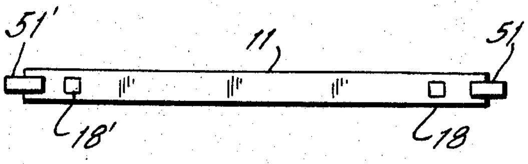
FIG. 2 shows an end view of the embodiment of FIG. 1*a* looking into the direction of arrows 2A—2A of FIG. 1*a*.

The exemplary embodiment of FIGS. 1*a*–2 is comprised of a thin, square plate-shaped container 11 having a pair of radially aligned apertures 13 and 13′, which apertures are normally sealed by movable shutters 14 and 14′ respectively. Since the shutter arrangement provided for each aperture (either on one side or both sides of the container) are substantially identical in design and operation, only one shutter arrangement will be described herein for purposes of simplicity, it being understood that the other arrangement can be and preferably is identical.

Figure 3:
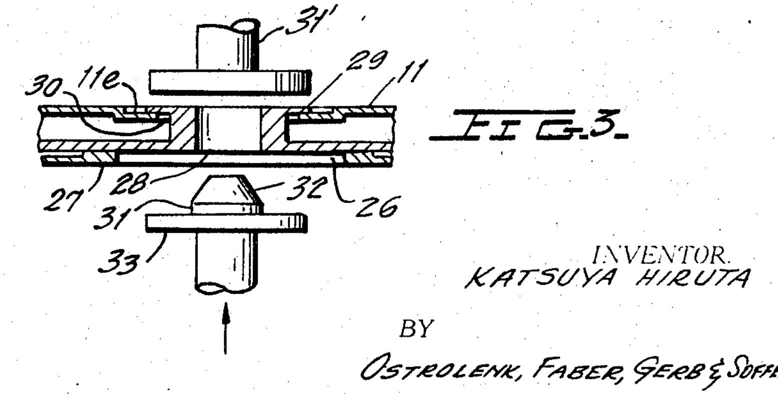
FIG. 3 shows a sectionalized end view of the central portion of the cartridge of FIG. 1*a* and the manner in which the storage equipment driving means cooperates therewith.

The shutter 14 is secured to an elongated slide rod 15 which may be guided by channel means (not shown) provided along the right-hand side of container 11 to allow the slide rod 15 to experience reciprocating movement therealong. A coil spring 16 has its upper end connected to the slide rod at 15*a* and has its lower end connected to the housing interior surface at 11*a*. Coil spring 16 is normally under tension, thereby causing the slide rod 15 to be normally urged in the vertically downward direction, as shown by arrow A in FIG. 1*a*. A stop member 17 which is integrally formed with slide rod 15 moves into position shown in FIG. 1*a* so as to normally seal a small aperture 18 provided in one side 11*b* of the container, as shown best in FIG. 2. The sealing arrangement occurs as a result of the spring 16 which maintains the slide rod 15 and stop member 17 normally in the position shown in FIG. 1*a*. The stop member 17 is pivotally linked by means of a coupling pin 19 to the right-hand end of a coupling link 20. The left-hand end of coupling link 20 receives a pin 19′ which, in turn, is further secured to a brake piece 21 arranged to experience reciprocal movement within a suitable channel (not shown) provided along the lower side 11*b* of cartridge assembly 11. The inclined surface 21*a* of brake element 21 is normally urged into abutting engagement with the periphery of magnetic disc element 12 as a result of the pulling action of coil spring 16. The disc 12 has an integrally formed cylindrical socket or spindle 28 designed to be engaged by disc driving means in a manner to be more fully described. The spindle 28 is further provided with a flange 29 which seals the opening 30 provided in the upper surface of container 11. The upper surface of container 11 is provided with a circular-shaped recessed portion 11*e* designed to support the interior surface of flange 29 so as to seal the container opening 30 when the spindle 28 is in the position shown in FIG. 4 to protect the magnetic disc element 12 within the container. The lower interior surface of container 11 is provided with an annular-shaped raised portion 27 which surrounds the circular aperture 26 relatively centrally located within the lower surface of cartridge 11, as best shown in FIG. 3. This raised portion acts to prevent the lower surface of the disc 12 from making contact with the opposing interior surface of container 11. In addition thereto, the raised portion serves to seal the recording surface portion of disc 12 against the elements. As can clearly be seen, the apertures 26 and 30 provided within container 11 are substantially greater in diameter than the spindle 28, allowing the spindle 28 and the disc 12 to experience movement away from a point (or line L) which may be considered to be the true center of container 11. The reason for this permissive movement is as follows:

The interior of container 11 is further provided with a pair of fixed protrusions 22 and 22′ arranged at spaced intervals in close proximity to the periphery of disc element 12. When the container is in the position shown in FIG. 1*a* (i.e. when no projecting pin 24 is inserted into aperture 18) coil spring 16 causes stop member 17 to be maintained in sealing engagement with aperture 18. Simultaneously therewith, shutter 14 seals opening 13 and the inclined surface of braking member 21 is urged against the periphery of disc element 12 causing the disc to be clamped or locked between the inclined surface 21*a* and the protrusions 22 and 22′. In the locking position, the central axis of spindle 28 is offset from the true center of container 11. Once the disc container is inserted within information storage equipment, the spindle and disc are returned to the true center location, in a manner to be more fully described, at which location the periphery of the disc is clear of protrusions 22 and 22′, as well as braking element 21, and thus, is free to be rotatably driven. Thus, the magnetic disc may be maintained in a locked position within the container 11 by the toggle action of coupling link 20 so as to prevent the disc element from being jarred or from striking any elements within the container while in storage or while being handled.

Figure 4:
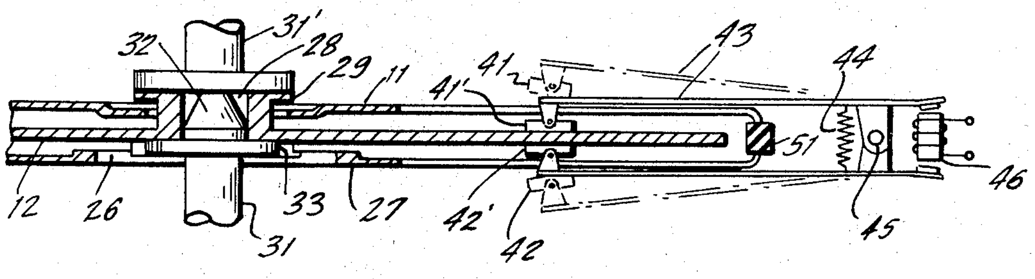
FIG. 4 shows a sectionalized view of the cartridge of FIG. 1*a* in the operating state and being engaged with operating head means maintained in contact with the disc surface.

The disc receiving and supporting portion 23 of a magnetic disc-type information storage device is provided with pins 24 and 24' at spaced locations as can best be seen in FIG. 1*a*, which locations coincide with the alignment of the apertures 18 and 18', shown best in FIGS. 1*a*, 1*b* and 2. Container 11 is loaded into the equipment by sliding it in the direction shown by arrow A. The container is guided into the equipment by means of guide rails 51 and 51' rigidly secured to the equipment, which guide rails are received by suitable channels **11*d* provided along the left and right-hand edges of the container, only one of which is shown in FIG. 4 for purposes of simplicity. After positioning the channels 11*d* so as to receive the cooperating edges of guide rails 51 and 51', the container 11** is moved in the direction shown by arrow A from the position of FIG. 1*a* to the position of FIG. 1*b*. Movement of the container 11 to the position shown in FIG. 1*b* causes the pins 24 and 24' provided along the supporting part of 23 of the equipment to enter into their cooperating apertures 18 and 18', respectively. The insertion of the pins 24 and 24' into their cooperating apertures drives their associated slide rods in a direction opposite to the direction of arrow A against the biasing force of the coil spring 16 so as to move shutter 14 from the position shown in FIG. 1*a* to the position shown in FIG. 1*b*, to simultaneously unseal stop member 17 from aperture 18, and further to simultaneously move the inclined surface of braking element 21 away from the peripheral edge of the disc element 12. Thus, the loading operation automatically opens the radially aligned apertures 13 and 13' (which may be provided on one or both sides of the container) as well as freeing the disc element to enable it to be rotated. Following the insertion process outlined hereinabove, the magnetic head 41 may be brought into contact with the surface of disc 12, as will be more fully described.

The foregoing description applies to the other side of tne container 11 operated by fixed pin 24' as well as applying to openings which may be provided on the opposing surface of container 11. It should be understood that only a pair of slide rods 15 and stop members 17 need be provided since the shutters may actually be a pair of shutters coupled to the slide rod 15 for selectively sealing and unsealing their cooperating apertures. There is no need for providing an additional braking element cooperating with projecting pin 24'. However, an additional braking element may be provided, if desired. In addition, another head corresponding to the magnetic head 41 may be brought into contact with the disc 12 through aperture 13' which will be open by shutter 14' when the container is in the fully inserted position.

FIG. 3 shows the driving means which may be incorporated within the information storage equipment and which is comprised of lower and upper driving shafts 31 and 31', respectively, which occupy the positions as shown in FIG. 3, relative to the disc element when it is in the fully loaded position. As shown in FIG. 3, the magnetic disc element 12 is supported upon an annular-shaped raised portion 27 which surrounds the central aperture 26 provided in the lower surface of container 11. As was previously described, the annular-shaped raised portion 27 serves as the means for preventing the lower surface of magnetic disc from making contact with the interior or opposing surface of container 11 as well as sealing the container 11 at the lower end surface of disc 12 to protect the disc surface from the elements. The flange 29 extending from spindle 28 is positioned on the exterior side of housing 11 and has a diameter greater than the diameter of container opening 30 so as to seal the container and thereby protect the upper surface of the magnetic disc. The circular depression **11*e* provided in the face of container 11 supports flange 29 so as to be substantially coplanar with the upper surface of container 11. The diameter of opening 30 limits the amount of displacement which the disc may experience relative to the center-line L of container 11**.

After the container 11 has been loaded into the information storage equipment, spindle 28 is moved into alignment with shafts 31 and 31'. The lower shaft 31 is introduced by a mechanism (not shown) so as to enter into the opening in spindle 28 so that the flange 33 surrounding shaft 31 may support disc 12 and urge it upwardly against upper shaft 31'. The tapered tip portion 32 of the lower shaft 31 facilitates engagement with spindle 28 and thereby facilitates alignment therebetween.

FIG. 4 shows the arrangement of the driving shafts 31 and 31' and the disc element 12 in the operative position. As is shown, magnetic disc element 12 is lifted above annular raised portion 27. In addition thereto, flange 29 provided on spindle 28 is lifted above the recessed portion **11*e* of container 11, which recessed portion surrounds opening 30. In this manner, the magnetic disc element 12 is coupled with and driven by the shafts 31 and 31' as a result of being compressed therebetween to provide a friction drive. As has already been described, the brake element 21** is maintained in disengaged relationship to the magnetic disc element, as shown best in FIG. 1*b*, thereby freeing the magnetic disc from any impediments to rotation.

The magnetic heads 41 and 42, shown in FIG. 4, are maintained in the disengaged position, as shown in dotted line fashion, at those times during which a container 11 is not loaded into the magnetic disc equipment to provide sufficient clearance for container insertion. Upon completion of the loading operation, an electromagnet 46 is automatically deenergized by circuit means (not shown) to bring the heads 41 and 42 into contact with the upper and lower magnetic surfaces of disc element 12, respectively. The automatic circuit may be comprised of a microswitch 70, shown in dotted line fashion in FIG. 1*a* having an operating button 71 which is depressed when the container makes abutting engagement with the button. As an alternative, the operation may be provided with a delay or may be provided to automatically operate the magnetic heads into engaged position after engagement of spindle 28 by the driving shafts 31 and 31'. The magnetic heads 41 and 42 are mounted upon supporting members 43 which, in turn, are pivotally mounted upon a pin 45. The heads are urged toward surface contact with the magnetic disc by means of a coil spring 44 which is under tension and thereby causes the supporting members 43, 43, to be urged toward one another. The connecting leads for coupling the magnetic heads to the storage equipment have been omitted from the figures for purposes of simplicity. In addition thereto, the description of the driving mechanism for shafts 31 and 31' have been omitted for purposes of simplicity, it being obvious that any available conventional drive means may be employed therefore.

The magnetic heads are maintained in the dotted line positions, as shown in FIG. 4, by means of a magnet 46 which is normally energized to attract armatures **46*a* and 46*b* and thereby maintain the magnetic heads in the dotted line position to provide sufficient clearance for insertion of a container into the magnetic disc equipment. Deenergization of the electromagnet 46 places the supporting members 43, 43 under control of coil spring 44**, to bring the heads into engagement with the disc surfaces.

In order to remove the container from magnetic disc equipment, the magnet 46 is energized to again attract its armatures **46*a* and 46*b* and thereby detach or disengage the magnetic heads from the disc surface as well as being lifted away from the container. Shaft 31 is then restored to the position shown in FIG. 3 causing the magnetic disc to again be supported by the annular raised portion 27. The downward movement of the spindle and discs 28, and 12, respectively, seals apertures 26 and 30 surrounding spindle 28. The container 11** is then moved in the reverse direction from arrow A, shown in FIG. 1*a*, causing pins 24 and 24' to be removed from their associated apertures 18 and 18', respectively. As the pins 24 and 24' are removed the slide rods 15 are placed under control of their associated coil springs 16 to simultaneously operate the shutters 14 and 14', seal openings 18 and 18' and urge braking element 21 against the disc periphery to lock the disc by means of break element 21 and protrusions 22 and 22'.

FIGS. 5*a* and 5*b* show a slightly modified embodiment relative to FIGS. 1*a*–2. In the alternative embodiment, the brake element and locking member 191 is secured to the far end of slide rod 15, as viewed from aperture 18. The slide rod 15 moves along a guide rail 25 provided in either one or both sides of the interior of container 11. A pair of fixed protrusions 22 and 22' are disposed in the lower end of disc 12 to cooperate with locking member 191.

As will be readily understood from a consideration of FIGS. 5*a* and 5*b*, locking member 191 releases disc element 12 as the slide rod 15 is urged in the upward direction relative to the figures by pin 24, which bears against the stopper portion of the slide rod. At the same time, shutter 14, being fixedly secured to slide rod 15, is likewise moved vertically upward from the position shown in FIG. 5*a* to the position shown in FIG. 5*b*, to thereby open aperture 13. The structure and function of all other elements shown in these figures are identical to those of the first described embodiment and will not be further described for purposes of simplicity, it being understood that like components have been designated by like numerals as between the FIGS. 1 and 5.

As in the case of FIGS. 1*a* and 1*b*, container 11 is provided with another aperture 13' on the side opposite aperture 13. It should be understood that a similar shutter and slide rod assembly is provided to operate the shutter 14' and brake member 191 in a corresponding fashion. As an alternative measure, if desired, only one braking member may be provided, depending upon the particular needs of the user.

Figure 6A:
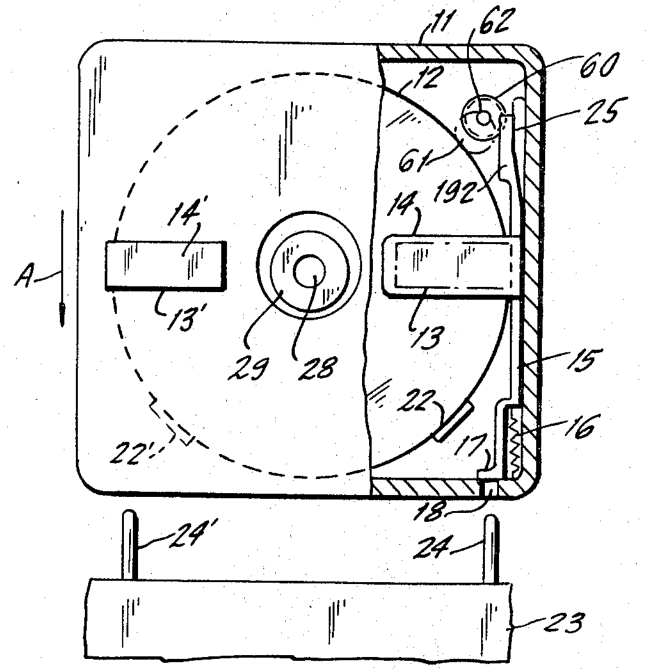
Figure 6B:
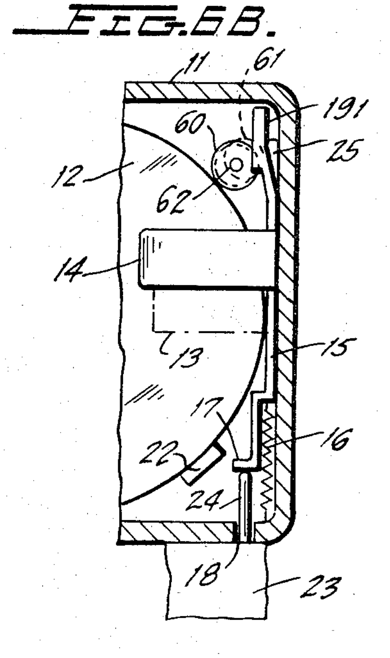

Still another modification is shown in FIGS. 6*a* and 6*b* in which the end portion of slide rod 15 is provided with a spur-gear surface 15*a*. An idle spur-gear pinion 60 and a cam member 61, which is eccentrically mounted upon pinion shaft 62, are positioned between the periphery of disc element 12 and end portion 192.

In the unloaded state of container 11, slide rod 15 is urged downwardly by coil spring 16 against the lower interior wall of container 11. In this state the spur-gear surface 15*a* drives the spur-gear pinion 60 so that its pinion shaft 62 rotates eccentrically mounted cam 61 into surface contact with the periphery of disc element 12. The pulling force of the coil spring 16 maintains eccentrically mounted cam 61 into firm contact with the disc periphery. Upon insertion of the container into magnetic disc equipment, pin 24 enters aperture 18, driving stopping member 17, slide rod 15 and spur-gear surface 15*a* in the direction reverse to that shown by arrow A. This causes counterclockwise rotation of the spur-gear pinion 60, rotating the eccentrically mounted cam 61 about the spur-gear pinion shaft 62 to a point approximately 180° from the position shown in FIG. 6*a* to the position shown in FIG. 6*b*. This arrangement disengages the eccentric cam member from the disc element, thereby freeing it to experience rotational movement. The eccentrically mounted cam member cooperates with the protrusions 22 and 22' to lock the disc when in the unloaded state. Since all other elements of FIGS. 6*a* and 6*b* are substantially identical in design and function to those shown in FIGS. 1*a* and 1*b*, any further description of these figures will be omitted for purposes of simplicity.

Figure 7A:
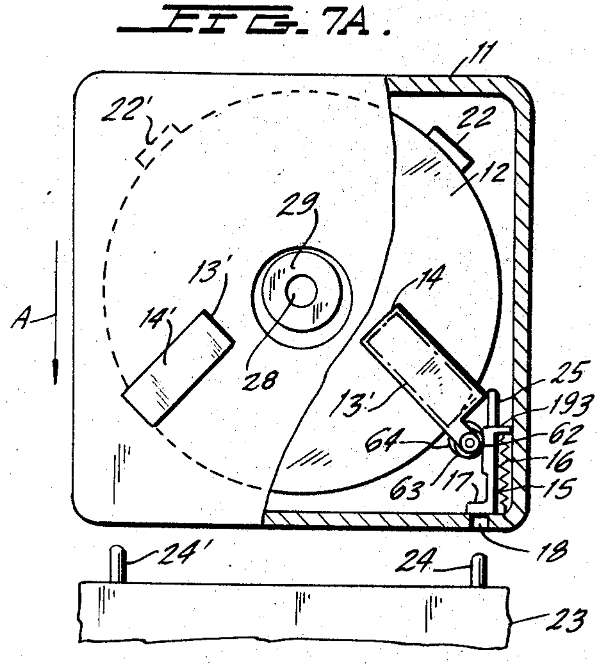
Figure 7B:
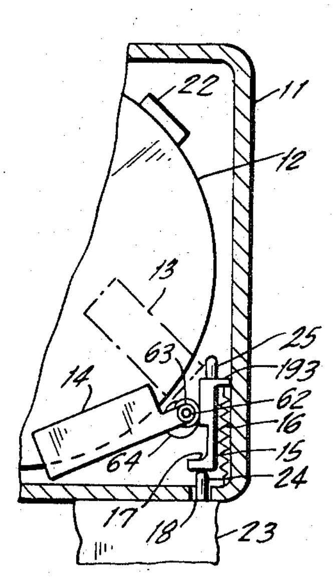

FIGS. 7*a* and 7*b* show still another modification of the present invention in which the shutters 14 and 14' are directly coupled with the shaft of an idle spur-gear 63. In the same manner as was shown in FIGS. 6*a* and 6*b*, an eccentrically mounted cam member 64 is mounted upon the spur-gear shaft 62. Slide rod 15, which is guided within guide rails 25 (only one of which is shown in FIGS. 7*a* and 7*b*), is provided with a spur-gear surface 193 near its upper end portion, which engages with the spur-gear pinion 63.

In the unloaded state, slide rod 15 is attracted downwardly by coil spring 16, driving the spur-gear pinion 63 clockwise to the position shown in FIG. 7*a*, causing the eccentrically mounted cam 64 to be urged against the periphery of disc element 12 and simultaneously therewith causing shutter 14 which is rigidly secured to shaft 62 to the sealed position as shown in FIG. 7*a*.

Upon insertion into magnetic disc equipment, pin 24 enters into small aperture 18, driving the stopping member 17 and slide rod 15 upward in the direction reverse from that shown by arrow A, causing the spur-gear surface 193, provided at the end portion of slide rod 15, to rotate idle-gear 63 counterclockwise and thereby simultaneously move shutter 14 from the position shown in FIG. 7*a* to the position shown in FIG. 7*b* and to separate eccentrically mounted cam 64 from engagement with the periphery of disc element 12. As is obvious from FIGS. 7*a* and 7*b*, the eccentrically mounted cam member 64, when in engagement with the periphery of disc element 12, cooperates with protrusions 22 and 22' to lock the disc element against movement when the container is in the unloaded state.

In the embodiment shown in FIGS. 7*a* and 7*b*, it is preferable to form the apertures 13 and 13' not in accordance with point-symmetry in the plane of container 11, but preferably in the line-symmetry manner in the same plane of the container as shown in the figure. In other words, it is preferable to align the apertures 13 and 13' substantially at right angles as opposed to being substantially along the diameter of the disc, since straight-line arrangement would place the aperture 13' at the furthest corner of the container from the magnetic disc equipment support 23, which arrangement would somewhat complicate the operating mechanisms provided within the container.

If desired, however, any preferred alignment may be provided.

It can be seen from the foregoing that the present invention provides a novel memory assembly comprising a magnetic disc permanently stored within a container, having means for locking the disc within the container against movement or jarring when not in use, having means for substantially completely sealing the container to prevent the disc from being soiled or damaged and being further designed to permit simple insertion of the container into the magnetic disc equipment wherein normally sealed openings are unsealed by shutter assemblies to allow magnetic heads to gain access to the drum surface when in the operative state, as well as providing suitable access or driving means to the disc spindle.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. A removable magnetic disc assembly for use in conjunction with magnetic storage equipment having first guide means to facilitate insertion of the assembly into the equipment and having an operating means projecting in the direction of the assembly, said assembly being comprised of:

a magnetic disc;

a flat realtively thin container enclosing said disc;

at least one opening provided in one face of said container;

a shutter assembly being reciprocally mounted along a first interior edge of said container, said container interior having second guide means for guiding said shutter assembly to experience reciprocal motion along a straight path;

bias means mounted between said container interior and said shutter assembly for normally urging said shutter assembly in sealing relationship with said opening;

movable braking means provided within said container being coupled to said shutter assembly to lock said disc against movement when said shutter assembly seals said opening;

a small aperture being provided in a second edge of said container adjacent said first edge;

third guide means being provided along opposite first and third edges of said container, which edges are adjacent said container second edge, for cooperating with said first guide means;

said operating means being positioned to enter said aperture and move said shutter assembly away from its sealing relationship with said opening to provide access to the surface of said disc confronting said opening;

said braking means being disengaged from said disc when said shutter assembly is displaced from said sealing relationship with said opening.

2. The disc assembly of claim 1 wherein said shutter assembly is comprised of a reciprocal slide rod movable along one edge of said container;

a flat shutter member secured to said slide rod and aligned substantially in spaced parallel fashion relative to the container face having said opening to thereby seal said opening.

3. The disc assembly of claim 2 wherein said braking member is a reciprocal member arranged to slide along fourth guide means provided within said container along said first edge; a coupling link coupling said braking member to said slide rod for urging one face of said braking member into engagement with the disc periphery.

4. The disc assembly of claim 2 further comprising a hollow spindle secured to the center of said disc;

first and second centrally located openings being provided in the upper and lower faces of said container for enabling access to said spindle;

projection means being provided upon said container interior surfaces adjacent the upper and lower openings to engage the disc in the region immediately surrounding the spindle to seal the disc within the container when in the unloaded state and to maintain the surfaces of said disc in spaced relationship relative to the interior surfaces of said container.

5. The disc assembly of claim 2 wherein said locking means is fixedly secured to said slide rod and is diagonally aligned relative to the path of movement of said slide rod to bear against the periphery of said disc to lock the disc when in the unloaded state.

6. The disc assembly of claim 2 wherein said locking means is comprised of:

a shaft mounted within said container;

a cam eccentrically mounted upon said shaft;

first gear means mounted upon said shaft;

second gear means provided upon said slide rod engaging said first gear means for driving said cam into locking engagement with the periphery of said disc when said container is in the unloaded state and for disengaging said cam from the disc periphery when the operating means engages the slide rod in the loaded state.

7. The disc assembly of claim 2 wherein said locking means is comprised of:

a shaft mounted within said container;

a cam eccentrically mounted upon said shaft;

first gear means mounted upon said shaft;

said shutter assembly comprising a reciprocally mounted slide rod positioned within said container; and a shutter member mounted for rotation upon said shaft;

second gear means provided upon said slide rod engaging said first gear means for driving said cam into locking engagement with the periphery of said disc and said shutter member into sealing relationship with said opening when said container is in the unloaded state and for disengaging said cam from the disc periphery and for displacing said shutter member from said opening when the operating means engages the slide rod in the loaded state.

References Cited

UNITED STATES PATENTS 3,304,544 2/1967 Johnson et al. ------ 340—174.1
3,352,976 11/1967 Gonmori --------- 479—100.2

BERNARD KONICK, Primary Examiner

WILLIAM F. WHITE, Assistant Examiner